United States Patent

Owens et al.

[15] 3,660,101
[45] May 2, 1972

[54] PHOTOGRAPHIC MATERIALS AND PROCESSES

[72] Inventors: James M. Owens; James L. Graham, both of Rochester, N.J.; Edward A. Pilsworth, Toronto, Ontario, Canada

[73] Assignee: Eastman Kodak Company, Rochester, N.Y.

[22] Filed: Apr. 30, 1969

[21] Appl. No.: 840,574

Related U.S. Application Data

[62] Division of Ser. No. 465,736, June 21, 1965, Pat. No. 3,469,987.

[52] U.S. Cl. .................................96/120, 96/1.6, 96/1.7, 96/88, 96/130, 106/137, 117/36.9
[51] Int. Cl. ....................G03c 1/08, G03g 5/00, C09h 11/00
[58] Field of Search..................96/102, 106, 1.6, 84, 100, 96/90, 88; 117/36.9; 106/135, 137

[56] References Cited

UNITED STATES PATENTS

| | | | |
|---|---|---|---|
| 2,322,027 | 6/1943 | Jelley et al. | 96/97 |
| 2,550,473 | 4/1951 | Green et al. | 117/36.7 |
| 2,801,171 | 7/1957 | Fierke et al. | 96/100 |
| 3,469,985 | 9/1969 | Bailey et al. | 96/84 |
| 3,503,745 | 3/1970 | Yomada et al. | 96/90 |

Primary Examiner—Norman G. Torchin
Assistant Examiner—Richard E. Ficht
Attorney—R. Frank Smith and Ogden H. Webster

[57] ABSTRACT

Dispersions useful in spectrally sensitizing photographic materials are provided which comprise spectral sensitizing dyes dissolved in a hydrophilic colloid. Methods for the preparation of such dispersions are also provided which feature dissolving the dye in an organic solvent, and adding the dye solution to the hydrophilic colloid.

8 Claims, No Drawings

PHOTOGRAPHIC MATERIALS AND PROCESSES

This application is a division of our copending application Ser. No. 465,736, filed June 21, 1965 now U.S. Pat. No. 3,469,987.

This invention relates to new processes for spectrally sensitizing photographic materials, and to new compositions useful in such processes.

In one aspect of this invention, photosensitive materials dispersed in a hydrophilic colloid which are sensitized in accordance with this invention tend to exhibit lower fog and generally higher sensitized speed than similar emulsions spectrally sensitized in accordance with prior art procedures. In addition, such sensitized photographic materials may be coated at high speeds without the occurrence of coating defects caused by organic solvents in the system. Organic solvents were previously necessary in fairly large quantities in order to introduce the sensitizing dye in the emulsion.

As is well known, most spectral sensitizing dyes for photosensitive materials, such as silver halide, are highly insoluble in water. For many purposes, it is desirable to incorporate these water-insoluble dyes in aqueous systems, such as a dispersion of a photosensitive material, e.g., silver halide, in a hydrophilic binder such as gelatin. Most of these dyes are so insoluble that large quantities of organic solvent are required to dissolve the dye for incorporation into the aqueous system. When large quantities of organic solvent are introduced in hydrophilic colloid systems, serious problems are encountered, such as coating defects when coating the hydrophilic colloid system on a support. It would, therefore, be highly desirable if an improved process could be provided for incorporating water-insoluble dyes in hydrophilic systems.

This invention solves the problem of excess solvent when incorporating water-insoluble dyes in hydrophilic colloids containing photosensitive materials, and in addition normally provides an unexpected reduction in fog and, generally, an increase in sensitized photographic speed. Since only extremely small quantities of organic solvent are employed in the process of the invention, difficulties such as coating problems arising from prior art techniques are avoided.

One object of this invention is to provide a novel process for spectrally sensitizing photosensitive materials. A further object of this invention is to provide a novel process for dispersing sensitizing dyes in hydrophilic colloids containing photosensitive materials, such as silver halide. Still another object of this invention is to provide a process for making dispersions of sensitizing dye in hydrophilic colloids. Another object of this invention is to provide novel dispersions of dye in hydrophilic colloids. Other objects of this invention will be apparent from the description herein and the appended claims.

These and other objects of this invention are accomplished by novel processes and compositions which are interrelated, and will be more apparent from the following disclosure and claims.

In one embodiment of this invention, photosensitive materials are spectrally sensitized by forming a dispersion of a spectral sensitizing dye in a hydrophilic colloid, and the photosensitive material is then contacted with said dispersion.

In another embodiment of this invention, a spectral sensitizing dye is incorporated in a hydrophilic colloid by dissolving the dye in an organic solvent, and then adding the dissolved dye to a hydrophilic colloid.

In still another embodiment of this invention, novel compositions are provided comprising dispersions of spectral sensitizing dye in a hydrophilic colloid which is essentially free from photosensitive materials, the particles of the dye in the colloid having an average diameter of less than about 1.0 microns.

This invention will be further illustrated by the following examples which show the spectral sensitization of photosensitive materials by contacting them with a dispersion of spectral sensitizing dye in a hydrophilic colloid. Preferably, the solvent is heated to dissolve the dye in as high a concentration as possible. The solution of dye is then combined with a hydrophilic colloid, such as an aqueous gelatin solution. A wetting agent may advantageously be employed to aid in dispersing the dye in the hydrophilic colloid. The dispersion of dye in hydrophilic colloid may be milled or homogenized. In Examples 1–4, the solvent employed to dissolve the dyes is a substantially water-immiscible organic solvent which has a sufficiently high vapor pressure to volatilize from the dispersion upon drying. After forming the dispersion of dye in hydrophilic colloid, the dispersion is dried to remove essentially all of the solvent.

EXAMPLE 1

A negative speed gelatino silver bromoiodide emulsion is digested to optimum sensitivity with a mixture of labile sulfur compound and a soluble gold salt, and divided into two portions. These portions are spectrally sensitized in the 5000 to 6000 A range as follows:

a. Dye I, a benzothiazolylidene-isopropylidene-oxazolidinedione merocyanine dye of the type described in Example 7 of U.S. Pat. No. 2,165,338, is added to the melted emulsion with good agitation at the rate of 0.132 g per mole of silver halide from an acetone solution.

b. Dye I is predispersed in aqueous gelatin as follows:

| Dye I | 0.130 g |
| Acetic acid | 3 cc |
| Ethyl acetate | 70 cc |
| 10% aqueous gelatin | 200 cc |
| 5% aqueous Alkanol B | 75 cc | and that composition is, dried and added to the emulsion as the plumped and melted dispersion at the rate of 0.132 g of dye per mole of silver halide. The wetting agent used in this example is an alkylnaphthalene sodium sulfonate product sold as Alkanol B by DuPont.

Each emulsion is further treated by the addition of a magenta-forming coupler of the pyrazolone type suitably dispersed in a high boiling solvent. The emulsions are then coated on a suitable support. The resulting coatings are exposed for one-twenty-fifth second to the light emitted by a 500 watt tungsten lamp adjusted to 2650°K in an intensity scale sensitometer further modified by a Wratten No. 15 filter and processed by the color negative process disclosed by Hanson Jr. and Kisner in "Journal of the Society of Motion Picture and Television Engineers," Vol. 61 (1953) pages 667–701, at page 683. The following results are obtained:

| Feature | Relative Speed | Minimum Density |
|---|---|---|
| Sensitized as in (a) (12 min. dev.) | 100 | .36 |
| Sensitized as in (b) (12 min. dev.) | 155 | .12 |
| Sensitized as in (a) (14 min dev.) | 79 | .44 |
| Sensitized as in (b) (14 min. dev.) | 159 | .17 |
| Sensitized as in (a) (16 min. dev.) | 76 | .53 |
| Sensitized as in (b) (16 min. dev.) | 178 | .24 |

It may be seen from the above table that a substantial increase (over 50 percent) in sensitized speed is realized with the sensitizing technique of this invention. In addition, the results show a great reduction in fog ($D$min) over the same emulsions sensitized in accordance with the prior art method of spectrally sensitizing. Similar results are obtained when the light sensitive material is $TiO_2$ or ZnO instead of silver halide, and the hydrophilic colloid, instead of gelatin, is cellulose ether phthalate, polyvinyl alcohol, or polyacrylamide having a combined acrylamide content of 30–60 percent and a specific viscosity of 0.25 to 1.5, and mixtures thereof. The dispersions of sensitizing dye in gelatin (and the other hydrophilic colloids) give good sensitization of binder-free silver halide films prepared by vacuum depositing silver halide on a support.

EXAMPLE 2

A negative speed gelatino silver bromoiodide emulsion digested to optimum sensitivity with a mixture of labile sulfur compound and a soluble gold salt is divided into two portions. These portions are optically sensitized in the 5000 to 6000 A region as follows:

c. With dye I as described in Example 1 (a) above.
d. Predispersing dye I according to the following formula:

| | | |
|---|---|---|
| Dye I | 0.130 g | |
| Benzene | 10 | cc |
| Ethyl acetate | 65 | cc |
| 10% Aqueous Gelatin | 200 | cc |
| 5% Aqueous Alkanol B | 75 | cc |

The dispersion is formed as in Example 1 (b), dried and added to the emulsion as the plumped and melted dispersion at the rate of 0.132 g of dye per mole of silver halide.

Each emulsion is further treated by the addition of a magenta forming coupler of the pyrazolone type suitably dispersed in a high boiling solvent. The emulsions are then coated on a suitable support.

The resulting coatings are exposed for one-twenty-fifth second to the light emitted by a 500-watt tungsten lamp adjusted to 2650°K in an intensity scale sensitometer further modified by a Wratten No. 15 filter and processed as in Example 1. The following results are obtained.

| Feature | Relative Speed | Minimum Density |
|---|---|---|
| Sensitized as in (c) 12 min. dev. | 100 | .65 |
| Sensitized as in (d) 12 min. dev. | 100 | .18 |
| Sensitized as in (c) 14 min. dev. | 110 | .84 |
| Sensitized as in (d) 14 min. dev. | 110 | .24 |
| Sensitized as in (c) 16 min. dev. | 126 | 1.06 |
| Sensitized as in (d) 16 min. dev. | 132 | .39 |

The above results show the lower fog, and increased sensitized speed upon extended development, of the emulsion spectrally sensitized in accordance with this invention.

EXAMPLE 3

A positive speed gelatino silver chlorobromide emulsion digested to optimum sensitivity with labile sulfur compounds is divided into two portions. These portions are then spectrally sensitized in the 6000 to 7000 A range as follows:

e. Dye II, a thiazolylidene-2-butenylidene-2-thiohydantion merocyanine dye of the type described in U.S. Pat. No. 2,177,403, is added slowly to the emulsion with good agitation from acetone-methanol solution at the rate of 0.060 g/mole of silver halide.
f. Dye II is predispersed as in Example 1 according to the following formula:

| | | |
|---|---|---|
| Dye in (e) | 0.066 | g |
| Benzene | 25 | cc |
| Ethyl acetate | 75 | cc |
| 10% aqueous gelatin solution | 200 | g |
| 5% aqueous Alkanol B solution | 100 | cc |

The predispersed dye is added to the emulsion as a plumped and melted dispersion at the rate of 0.060 g of eye per mole of silver halide.

Each emulsion was further treated by the addition of a phenolic cyan forming coupler dispersed in a high boiling solvent and coated on suitable supports.

The resulting coatings are exposed for 1 second to the light emitted by a 500W tungsten lamp adjusted to 3200°K in an intensity scale sensitometer further modified by a Wratten 29 filter, and processed as in Example 1. The following results are obtained:

| Feature | Relative Speed | Minimum Density |
|---|---|---|
| Example 3 (e) | 100 | .06 |
| Example 3 (f) | 142 | .06 |

These results show a substantial increase in relative speed of the emulsion sensitized in accordance with the invention.

EXAMPLE 4

Antifoggant action of dispersion sensitization is also evident in reversal processing of emulsions in the process described in U.S. Pat. No. 2,294,898, col. 11, as "Color Process 1." Slightly larger amounts of dye are used to increase the speed of the reference coating. Substantial antifoggant action is evident at these higher concentrations of dye and is found in the black and white developing step as lower $D_{min}$ and in full reversal color process as higher $D_{max}$.

The following results are obtained on coatings prepared as in Example 2 above with the exception of the higher concentration of dye as indicated.

| Feature | Black and White | | Color | Reversal |
| | $D_{min}$ | Relative Speed | $D_{max}$ | Speed |
|---|---|---|---|---|
| (c) (above) | .26 | 100 | 1.60 | 100 |
| (d) (above) at rate of 0.198 g dye/mole AgX | .15 | 100 | 1.86 | 100 |

The procedure of Example 5 shows a preferred method of dispersing spectral sensitizing dyes in hydrophilic colloids. In this method, the dye is first dissolved in a high-boiling, partially water-miscible solvent. Advantageously, the dye is dissolved in heated solvent to provide as high a concentration of dye in the solvent as possible. The concentrated solution of dye is then dispersed in an aqueous hydrophilic colloid, and the mixture is preferably milled or homogenized. This procedure results in an oil-in-water emulsion featuring small particle size globules of solvent containing the dye. This dispersion of dye in hydrophilic colloid may be used to sensitize photosensitive materials. If desired, the dispersion can be set and stored until it is desired to use the dispersion to sensitize a photographic material.

EXAMPLE 5

Dye A (a thiacyanine dye of the type described in Brooker et al. U. S. Pat. No. 2,231,658) and Dye B (an oxacarbocyanine dye of the type described in U. S. Pat. No. 2,295,276) were dissolved in methanol and in the high boiling solvent phenoxy ethanol as shown below:

| | Prior Art | Dispersion Method |
|---|---|---|
| Dye A | 1.5 grams | 1.5 grams |
| Dye B | 0.9 grams | 0.9 grams |
| Methanol for Dye A | 887.0 ml. | — |
| Methanol for Dye B | 1065.0 ml. | — |
| Phenoxy ethanol for Dye A | — | 75.0 ml. |
| Phenoxy ethanol for Dye B | — | 45.0 ml. |
| Total solvent | 1952.0 ml. | 120.0 ml. |

It should be noted that Dye A is normally dissolved in methanol at 0.05 g. per fl. oz. of methanol, and Dye B at 0.025 g. per fl. oz. of methanol. The phenoxy ethanol was heated to 220°F for Dye A and 180°F for Dye B in the above samples. It will be seen that prior art methods resulted in the introduction of 1952 ml. of organic solvent into an emulsion, whereas to introduce the same concentration of dyes, only 120 ml. of organic solvent are introduced into the system. The high boiling solvent solution of dye is, while hot, mixed into an aqueous solution of gelatin containing a surfactant, and milled or homogenized. The resulting dispersion is allowed to set and may be stored, e.g., at about 40° to 50°F. The set gel is added directly to a warm silver halide emulsion, where it is dissolved causing the sensitizing dye to precipitate as a crystalline or amorphous solid dispersion of very fine, uniform particle size (average diameter is under 1 micron). The very fine dye dispersion obtained has a high surface area to mass ratio which promotes dye dissolving and transfer to the silver halide grains. Similar results are obtained when the phenoxy ethanol is replaced with n-butanol, and with ethyl acetate.

The lower fog and higher sensitized speed of emulsions sensitized with the dispersion of Example 5 are shown in Examples 6 and 7.

EXAMPLE 6

Two multilayer color films are prepared as described in Example 1 of VanCampen U.S. Pat. No. 2,956,879. The green sensitive emulsion is spectrally sensitized with an oxazole-thiohydantoin dye of the type described in Example 3 of Brooker U.S. Pat. No. 2,282,116 using about 180 mg per mole of silver halide. In one case the dye is added from a solution consisting of 25 mg of dye per 30 ml of acetone-methyl alcohol 1:1. In the second case the dye is in the form of a dispersion in gelatin containing 2 g of dye per pound of dispersion prepared as described in Example 5 (the set dispersion of dye in gelatin is added to the warmed emulsion).

The coated films are exposed and developed for 25 minutes in a developer of the type described in Example 1 of U.S. Pat. No. 2,956,879 and processed as described in this patent with the following results.

| Green Sensitized With | Magenta Fog |
|---|---|
| Dye solution | .22 |
| Dye dispersion | .11 |

The following example illustrates the increase in sensitivity that can be obtained using sensitizing dye dispersions.

EXAMPLE 7

Two multilayer coatings containing dye-developers are prepared as described in Example 1 of Weyerts and Salminen U.S. Pat. No. 3,146,102. The red sensitive emulsion is spectrally sensitized with a thiacarbocyanine dye of the type described in Example 9 of Sprague U.S. Pat. No. 2,503,776 using about 140 mg of the dye per mole of silver halide. In one case the dye is added from a solution consisting of 120 mg of dye per 30 cc of methyl alcohol. In the second case the dye is added in the form of a dispersion containing 2 g of the dye per pound of dispersion prepared as described in Example 5 (the set dispersion of dye in gelatin being added to the warm emulsion).

The coated films are exposed and processed as described in U.S. Pat. No. 3,146,102 using an activator similar to activator IVQ described in this patent. The following results were obtained.

| Red Sensitized With | Relative Speed of the Red Sensitive Emulsion Layer |
|---|---|
| Dye solution | 100 |
| Dye dispersion | 151 |

Results similar to those in Examples 6 and 7 are obtained when the solvent is n-butanol and instead of gelatin, the hydrophilic colloid is polyvinyl alcohol.

The preparation of sensitizing dye dispersions and sensitizing photosensitive materials is further illustrated in the following example. This example shows the technique of dissolving a spectral sensitizing dye in a volatile, water-miscible solvent, and adding this solution to a heated aqueous solution of hydrophilic colloid, which is then chilled and set. The solvent vaporizes from the colloid, leaving a fine dispersion of dye crystals in the colloid. This dispersion may then be used to spectrally sensitize photosensitive materials. No milling or homogenizing of the dispersion is necessary in this method to get very fine crystals of dye.

EXAMPLE 8

A cyanine dye (a 2,2' cyanine) (1.6 grams) is refluxed in 4.2 fl. oz. of methanol, and when it is dissolved the hot solution is immediately poured into 18 fl. oz. of well agitated 5 percent aqueous solution at 95°F. The resulting dispersion is immediately cooled and set. This dispersion is then added to a gelatin silver halide emulsion to spectrally sensitize the silver halide, with results similar to those of the above examples.

This invention is applicable to spectral sensitizing dyes which are substantially insoluble in aqueous solutions. Spectral sensitizing dyes with which this invention are concerned generally have a solubility in water (at 20°C) of less than about 1 percent. Among the useful spectral sensitizing dyes are the cyanine dyes, the hemicyanine or merocyanine dyes, styryl dyes and the like, such as:

3,3'-diethylthiacarbocyanine iodide;
1',3-diethyl-7-methylthia-2'-cyanine iodide;
2,p-dimethylaminostyrylbenzothiazole ethiodide;
[2-(3-ethylthiazoline)][4-(2-acetamino-5(4)-thiazolone]dimethinemerocyanine;
oxonol dyes such as 3-hydroxy-3'-oxy-2,2'-methenyldithionaphthene; phthaleins such as erythrosine;
and other dyes containing the amidinium-ion-auxochromophore system, such as rhodamine, pinacyanol and pinaflavol. Other useful dyes are described in Brooker U.S. Pat. Nos. 1,846,301, issued Feb. 23, 1932; 1,846,302, issued Feb. 23, 1932; and 1,942,854, issued Jan. 9, 1934; White U.S. Pat. No. 1,990,507, issued Feb. 12, 1935; Brooker and White U.S. Pat. Nos. 2,112,140, issued Mar. 22, 1938; 2,165,338, issued July 11, 1939; 2,493,747, issued Jan. 10, 1950, and 2,739,964, issued Mar. 27, 1956; Brooker and Keyes U.S. Pat. Nos. 2,493,748, issued Jan. 10, 1950; Sprague U.S. Pat. Nos. 2,503,776, issued Apr. 11, 1950, and 2,519,001, issued Aug. 15, 1950; Heseltine and Brooker U.S. Pat No. 2,666,761, issued Jan. 19, 1954; Heseltine U.S. Pat. No. 2,734,900, issued Feb. 14, 1956; Van Lare U.S. Pat. No. 2,739,149, issued Mar. 20, 1956; and Kodak Limited British Pat. No. 450,958, accepted July 15, 1936.

Photosensitive materials which can be spectrally sensitized include silver halide, such as silver bromide, silver chloride, silver iodide, and mixed silver halides such as silver chloroiodide and silver bromoiodide. Other photosensitive materials may be spectrally sensitized by this invention, such as $TiO_2$ or ZnO. The photosensitive material to be sensitized may be dispersed or suspended in a hydrophilic colloid binder solution, or the dispersion of this invention may be applied over binder-free deposits of the photosensitive material, such as supports having vacuum deposited thereon a light sensitive silver halide layer.

Any suitable solvents may be used for dissolving the dyes, the cyanines generally being soluble in lower alcohols such as methanol and the merocyanines generally having good solubility in ketones such as acetone. The organic solvents which may be used may be water-miscible, water-immiscible or partially water-miscible. In one embodiment of the invention, the solvent used has a sufficiently high vapor pressure to volatilize from the hydrophilic colloid, thereby providing compositions which may be entirely free of organic solvent, or compositions which contain such a small quantity of organic solvent that coating problems are avoided.

Especially useful are the partially water-miscible solvents, such as organic solvents having a solubility between 1 and 8 percent at room temperature (20°C or 68°F) and a boiling point above 175°F. Typical preferred solvents of this type are:

| | |
|---|---|
| Pentanol-2 | Ethyl Acetate |
| n-Butanol | Methyl n-propyl Ketone |
| 2-Methyl propanol-1 | Methyl isobutyl Ketone |
| Butyl Carbitol Acetate | Methyl phenyl Carbitol |
| Cyclohexanol | 2-Ethyl, 1,3-hexane diol |
| Cyclohexanone | Diethyl Acetal |

It has been found that such solvents when employed in the process of preparing dispersions of sensitizing dye and hydrophilic colloid results in desirable small particle size. The high boiling point, such as over 175°F, is desirable to enable preparation of more concentrated solutions of sensitizing dye in the solvent, sensitizing dyes having greater solubility at elevated temperatures.

In order to obtain good spectral sensitized speed, it is desirable that the particle size of the dye crystals in the hydrophilic colloid have an average diameter of less than about 1 micron. Dispersions of dyes having large particle size do not effectively sensitize photographic materials.

The process of spectrally sensitizing hydrophilic photosensitive systems in accordance with this invention is particularly useful when the system is being coated at high speeds, such as over 150 feet per minute. The dispersions of sensitizing dye provided by this invention may be incorporated in warm solutions of the hydrophilic photosensitive system shortly before coating. The photosensitive system in which the dispersions are being incorporated may be concentrated; for example, gelatin silver halide emulsions in which more than one-twentieth, such as one-third or more, of the gelatin emulsion is silver halide, and the emulsion viscosity is at least 50 cps., such as 500 cps. or more. The small amount of organic solvent employed in the processes and dispersions in accordance with this invention allows high speed coating with such concentrated emulsions since only small quantities of organic solvent are present. Large quantities of organic solvents cause coating defects in various ways, such as by causing local dehydration of the hydrophilic colloid which results in particulate matter which cannot readily be redispersed. This particulate matter remains in the composition causing coating defects such as streaks or spots. The process of sensitizing as described herein is highly useful in wet-on-wet coatings, and high speed coatings such as the coating techniques described in British Pat. Nos. 855,216; 925,179; U.S. Pat. Nos. 2,620,285 and 2,681,294. The coating may be applied simultaneously with at least one other layer such as by using the procedures described in U.S. Pat. Nos. 2,941,898 of N. R. Wynn or in 2,761,791 of T. A. Russell. The coating operation is conveniently carried out using an emulsion having a viscosity of 50-150 centipoises and a coating speed of 150-500 feet per minute.

The dispersions of sensitizing dye and hydrophilic colloid provided herein are highly stable. However, prior art solutions of spectral sensitizing dye in organic solvent remain stable for a very short time. This feature of the novel dispersions of the dye is highly useful in commercial operations, since dispersions of the dye can be formed and stored for relatively long periods of time until required in the course of manufacturing sensitized materials.

A wide variety of hydrophilic, water-permeable organic colloids can be suitably utilized in preparing the dispersions of sensitizing dyes of this invention. Gelatin is preferably utilized although other colloidal material such as colloidal albumin, cellulose derivatives, synthetic resins or the like can be utilized. Suitable colloids that can be used are polyvinyl alcohol or a hydrolyzed polyvinyl acetate as described in Lowe, U. S. Pat. No. 2,286,215, issued June 16, 1942; a far hydrolyzed cellulose ester such as cellulose acetate hydrolyzed to an acetyl content of 19 to 26 percent as described in U. S. Pat. No. 2,327,808 of Lowe and Clark, issued Aug. 24, 1942; a water-soluble ethanolamine cellulose acetate as described in Yutzy, U. S. Pat. No. 2,322,085, issued June 15, 1943; a polyacrylamide having a combined acrylamide content of 30 to 60 percent and a specific viscosity of 0.25 to 1.5, or an imidized polyacrylamide of like acrylamide content and viscosity as described in Lowe, Minsk and Kenyon, U. S. Pat. No. 2,541,474, issued Feb. 13, 1951; zein as described in Lowe, U. S. Pat. No. 2,563,791, issued Aug. 7, 1951; a vinyl alcohol polymer containing urethane carboxylic acid groups of the type described in Unruh and Smith, U. S. Pat. No. 2,768,154, issued Oct. 23, 1956; or containing cyano-acetyl groups such as the vinyl alcohol-vinyl cyanoacetate copolymer as described in Unruh, Smith and Priest, U. S. Pat. No. 2,808,331, issued Oct. 1, 1957; or as a polymeric material which results from polymerizing a protein or a saturated acylated protein with a monomer having a vinyl group as described in Illingsworth, Dann and Gates, U. S. Pat. No. 2,852,382, issued Sept. 19, 1958.

A still further advantage of the processes and compositions of this invention is the reduction in hazard in employing smaller quantities of organic solvents and less flammable solvents, thereby reducing hazards of fire, explosion or toxicity.

It was surprising to find that the dispersions of sensitizing dye in hydrophilic colloid could be used to spectrally sensitize photosensitive materials dispersed in a hydrophilic colloid. It would not be expected that the sensitizing dye would diffuse through an aqueous solution of hydrophilic colloid in which the dye is relatively insoluble and become adsorbed to a photosensitive material such as silver halide crystals.

The invention has been described in detail with particular reference to preferred embodiments thereof, but it will be understood that variations and modifications can be effected within the spirit and scope of the invention as described hereinabove and as defined in the appended claims.

I claim:

1. The process of preparing dispersions useful in spectrally sensitizing photosensitive materials which comprises:
    a. providing a concentrated solution of a substantially water-insoluble silver halide spectral sensitizing dye in organic solvent by heating a mixture of the dye and solvent at a temperature of at least 175°F, said organic solvent having a boiling point of at least 175°F and being partially water-miscible; b. adding the heated solvent solution of dye to a hydrophilic colloid which is essentially free from photosensitive material and organic solvent; c. milling the hydrophilic colloid; and, d. cooling the dispersion of dye in hydrophilic colloid.

2. The process of preparing dispersions useful in spectrally sensitizing photosensitive materials which comprises: a. providing a saturated solution of a substantially water-insoluble silver halide spectral sensitizing dye in organic solvent by heating a mixture of the dye and solvent at a temperature of at least 175°F, said organic solvent having a boiling point of at least 175°F and being partially water-miscible; b. adding the heated solvent solution of dye to gelatin which is essentially free from photosensitive material and organic solvent; c. milling the gelatin; and, d. cooling the dispersion of dye in gelatin.

3. A composition of matter useful in spectrally sensitizing photosensitive materials which comprises a hydrophilic colloid essentially free from photosensitive material and organic solvent, said colloid having uniformly dispersed therein a substantially water-insoluble silver halide spectral sensitizing cyanine dye, the particle size of the dye in said hydrophilic colloid being on an average less than about 1 micron in diameter.

4. The process of preparing dispersions useful in spectrally sensitizing photosensitive materials which comprises: a. dissolving a substantially water-insoluble silver halide spectral sensitizing dye in a volatile, water-miscible solvent;
    b. adding the solution obtained in (a) to a hydrophilic colloid which is essentially free from photosensitive material and organic solvent; and,
    c. heating the mixture obtained in (b) to vaporize the solvent from the hydrophilic colloid, thereby providing a fine dispersion of dye crystals in the colloid.

5. A composition of matter useful in spectrally sensitizing photosensitive materials which comprises a hydrophilic colloid essentially free from photosensitive material and organic solvent, said colloid having uniformly dispersed therein a substantially water-insoluble silver halide sensitizing dye, the particle size of the dye in said hydrophilic colloid being on an average less than about 1 micron in diameter.

6. A composition of matter useful in spectrally sensitizing photosensitive materials which comprises gelatin essentially free from photosensitive material and organic solvent, some gelatin having uniformly dispersed therein a substantially water-insoluble silver halide spectral sensitizing dye, the particle size of the dye in gelatin being on an average less than about 1 micron in diameter.

7. The process of preparing dispersions useful in spectrally sensitizing photosensitive materials which comprises: a. providing a saturated solution of a substantially water-insoluble photographic silver halide spectral sensitizing thiacyanine dye in phenoxy ethanol heated to about 220°F; and, b. adding the heated solution of dye to 10 percent aqueous gelatin which is essentially free from photosensitive material and organic solvent, and milling the gelatin containing the dye, the dye being present in a concentration of about 2 grams of dye per pound of the gelatin-dye composition.

8. A composition of matter useful in spectrally sensitizing photographic gelatin silver halide emulsions which comprises gelatin essentially free from photosensitive material and organic solvent, said gelatin having uniformly dispersed therein a substantially water-insoluble sensitizing thiacyanine dye, the particle size of the dye in said gelatin being on an average less than about 1 micron in diameter, said dye being present in a concentration of about 2 grams dye per pound of the gelatin-dye composition.

* * * * *